Nov. 2, 1926.　　　　　　　　　　　　　　　　　1,605,768
A. PATEMAN
PAPER CARRIAGE FOR TYPEWRITERS
Filed May 17, 1926
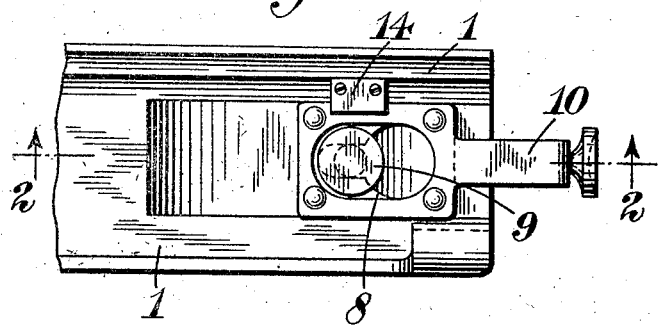
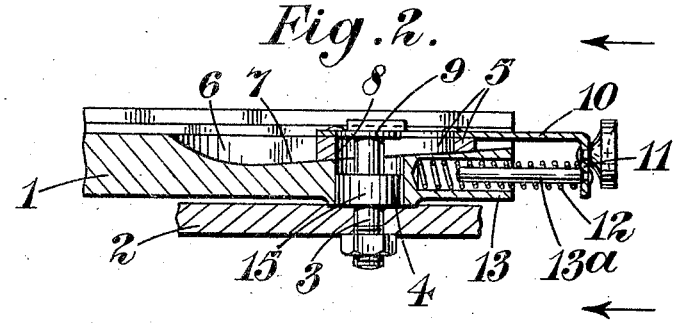
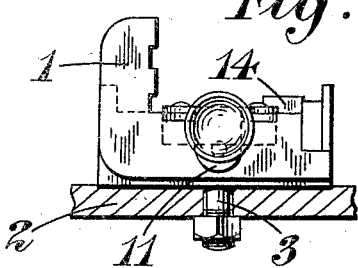
INVENTOR
Arthur Pateman,
BY Watson, Coit, Morse & Grindle
ATTYS.

Patented Nov. 2, 1926.

1,605,768

UNITED STATES PATENT OFFICE.

ARTHUR PATEMAN, OF LEICESTER, ENGLAND, ASSIGNOR TO IMPERIAL TYPEWRITER COMPANY LIMITED, OF NORTH ERVINGTON, LEICESTER, ENGLAND, A BRITISH COMPANY.

PAPER CARRIAGE FOR TYPEWRITERS.

Application filed May 17, 1926, Serial No. 109,799, and in Great Britain June 2, 1925.

This invention is for improvements in or relating to typewriters and has for its object to provide improved means for detachably connecting to the framework of the machine the runway bracket for the platen carriage.

According to the present invention there is provided means for detachably connecting a runway-bracket for a platen carriage or the like to a typewriter base, comprising a fixed headed member on one part and a co-operating member on the other in the form of a fine-taper sliding wedge engageable beneath and by the said head.

The invention will now be more fully described with reference to the accompanying drawings which illustrate a preferred embodiment, and in which Figure 1 is a plan of the improved connecting means.

Figure 2 is a vertical longitudinal section on the line 2—2 of Figure 1.

Figure 3 is an end elevation looking in the direction of the arrows of Figure 2.

The drawing illustrates one end only of the runway bracket, which is designated by the numeral 1, and it will be understood that the arrangement is duplicated at the other end of the bracket.

Fixed into the upper face of the framework 2 of the machine, is a headed stud 3 which extends through a passage 4 formed in the end of the bracket 1. This stud is arranged to interlock with a wedge 5 slidable with a smooth fit within a recess 6 formed with an inclined bottom surface 7. The wedge has a key-hole opening 8 formed in it, through which the stud extends, and the stud is formed with a head 9 of such diameter as to pass through the larger end of the opening 8 and interlock with the upper face of the wedge at the sides of the narrow portion of the opening, as shown.

The upper face of the wedge lies in a plane perpendicular to the axis of the stud 3 so that the underside of the head of the stud can bear evenly against the upper face of the wedge, irrespective of the position the latter may occupy along the length of the recess when interlocking takes place.

The inclination of the bottom surface 7 of the recess is comparatively slight. This provides for a fine-taper wedging action, which is desirable for the sake of rigidity of connection between the bracket and the framework.

The wedge 5 has secured to it a finger-piece 10 which extends beyond the end of the bracket 1 and is bent down at the extremity to provide an abutment 11 for one end of a compression spring 12. The other end of the spring 12 is received within a recess 13 formed in the end of the bracket 1 and bears against the inner end thereof.

A pin $13^a$, secured to the bent down extremity 11 of the finger-piece, extends centrally through the spring and serves on the one hand to guide the outer end of the spring into the recess 13 when the finger-piece is pushed towards the end of the bracket, and on the other, as a stop to limit the movement of the wedge so that the latter is automatically positioned in readiness for the withdrawal of the wedge from the stud, or for reverse operation.

The wedge may be retained within the recess 6 by a keeper 14 secured to the bracket at one side of the recess, as shown. Any other suitable means to this end may be employed, however.

The stud 3 is formed with an enlargement 15 which fits the passage 4 and serves to guide the head of the stud smoothly into the larger end of the key-hole opening of the wedge after the latter has been positioned as aforesaid. To this end the depth of the enlargement 15 is such that as the bracket is being introduced into position upon the framework, the enlargement enters the passage 4 before the head of the stud leaves it.

The location of the finger-piece 10 at either side of the machine is such that as the bracket is grasped by the hand to remove it from the framework, the finger-pieces are accessible to the fingers and can be pressed to unlock the wedge until the head of the stud has passed through the wedge. The spring-control then brings the wedge automatically into a position such that the narrow portion of the key-hole opening is vertically over the passage 4. This is advantageous since it enables the bracket to be correctly positioned if desired upon the two studs, at both sides of the machine, before the wedge at either side is operated, the heads of the studs entering the passage 4 and remaining there beneath the wedges, until the latter are pushed aside by the finger-pieces.

The construction described and illustrated is a preferred example only. A modification within the scope of the invention might be that the wedges were mounted on the framework instead of on the bracket.

I claim:—

1. In a typewriter provided with a detachable runway-bracket for the platen carriage, means for detachably connecting said bracket to the typewriter base comprising in combination a fixed headed member on one part and a fine-taper sliding wedge on the other engageable beneath and by the head of the headed member.

2. In a typewriter provided with a detachable runway-bracket for the platen carriage, means for detachably connecting said bracket to the typewriter base comprising in combination a fixed headed member on one part and a fine-taper sliding wedge on the other engageable beneath and by the head of the headed member, the wedge being formed with a key-hole slot to receive the headed member, which slot extends in the direction of sliding movement of the wedge with the larger end at the thinner end of the wedge so that, to establish connection, the head of the headed member can be passed through the larger end of the slot and the wedge thereafter slid into engagement with it opposite the narrow portion of the slot.

3. In a typewriter provided with a detachable runway-bracket for the platen carriage, means for detachably connecting said bracket to the typewriter base comprising in combination a fixed headed member on one part and a fine-taper sliding wedge on the other engageable beneath and by the head of the headed member, the wedge being yieldingly controlled in the direction of its wedging movement.

4. In a typewriter provided with a detachable runway-bracket for the platen carriage, means for detachably connecting said bracket to the typewriter base comprising in combination a fixed headed member on one part and a fine-taper sliding wedge on the other engageable beneath and by the head of the headed member, the wedge being yieldingly controlled in the direction of its wedging action and formed with a key-hole slot to receive the headed member, which slot extends in the direction of sliding movement of the wedge with the larger end at the thinner end of the wedge, so that to establish connection the wedge is first brought to a position such that the head of the headed member can be passed through the larger end of the slot, said head is so passed through, and finally the wedge is allowed to wedge itself under its yielding control into engagement with the head opposite the narrow portion of the slot.

5. In a typewriter provided with a detachable runway-bracket for the platen carriage, means for detachably connecting said bracket to the typewriter base comprising at each side of the bracket where the latter is grasped by the hands for removal to and from the base, a fixed headed member on the base and a finger-operated fine-taper sliding wedge on the bracket engageable beneath and by the head of the headed member.

6. In a typewriter provided with a detachable runway-bracket for the platen carriage, means for detachably connecting said bracket to the typewriter base comprising at each side of the bracket where the latter is grasped by the hands for removal to and from the base, a fixed headed member on the base and a finger-operated fine-taper sliding wedge on the bracket engageable beneath and by the head of the headed member, the wedge being yieldingly controlled in the direction of its wedging action and formed with a key-hole slot to receive the headed member, which slot extends in the direction of sliding movement of the wedge with the larger end at the thinner end of the wedge, so that to establish connection the wedge is first brought by the finger as the bracket is grasped to a position such that the head of the headed member can be passed through the larger end of the slot, said head is so passed through, and finally the wedge is allowed to wedge itself under its yielding control into engagement with the head opposite the narrow portion of the slot.

In testimony whereof I affix my signature.

ARTHUR PATEMAN.